(12) United States Patent
Ligman et al.

(10) Patent No.: US 9,531,600 B2
(45) Date of Patent: Dec. 27, 2016

(54) AUTOMATIC EXTRACTION, MODELING, AND CODE MAPPING OF APPLICATION USER INTERFACE DISPLAY SCREENS AND COMPONENTS

(71) Applicant: International Business Machines Corporation, Armonk, NY (US)

(72) Inventors: Joseph W. Ligman, Wilton, CT (US); Marco Pistoia, Amawalk, NY (US); John J. Ponzo, Hawthorne, NY (US); Gegi Thomas, Piermont, NY (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 13/969,524

(22) Filed: Aug. 17, 2013

(65) Prior Publication Data

US 2014/0215344 A1   Jul. 31, 2014

Related U.S. Application Data

(63) Continuation of application No. 13/752,955, filed on Jan. 29, 2013, now Pat. No. 9,111,091.

(51) Int. Cl.
*G06F 3/0484* (2013.01)
*G06F 3/048* (2013.01)
(Continued)

(52) U.S. Cl.
CPC ............ *H04L 41/22* (2013.01); *G06F 8/38* (2013.01); *G06F 8/65* (2013.01); *G06F 11/34* (2013.01);
(Continued)

(58) Field of Classification Search
CPC .. H04L 41/22; G06F 11/3624; G06F 11/3636; G06F 11/3644; G06F 11/3466
See application file for complete search history.

(56) References Cited

U.S. PATENT DOCUMENTS 7,451,408 B2   11/2008   Chan
7,661,103 B2    2/2010   Hayward
(Continued)

FOREIGN PATENT DOCUMENTS

WO   2014120350 A1   8/2014

OTHER PUBLICATIONS

D. Higgins, Screen editor and emulator, 1986, 4 pages.*
(Continued)

*Primary Examiner* — Thuy Dao
(74) *Attorney, Agent, or Firm* — Yee & Associates, P.C.; Daniel P. Morris

(57) ABSTRACT

Managing user applications is provided. A visual model of user interface display screens of a user application is generated by mapping components displayed within the user interface display screens to screen position coordinates and by mapping the screen position coordinates corresponding to the components to original source code of the user application. A runtime policy for each component in a selected set of components within the user interface display screens of the user application is generated based on user interaction with the generated visual model of the user interface display screens. The generated runtime policy for each component in the selected set of components is sent to a client device via a network. Activity of each component in the selected set of components in the client device is tracked using data that is tracked and logged on the client device based the generated runtime policy for each selected component.

10 Claims, 17 Drawing Sheets

(51) Int. Cl.
*H04L 29/08* (2006.01)
*H04L 12/24* (2006.01)
*G06F 9/445* (2006.01)
*G06F 21/55* (2013.01)
*G06F 9/44* (2006.01)
*G06F 11/34* (2006.01)
*H04L 12/26* (2006.01)

(52) U.S. Cl.
CPC ......... *G06F 21/552* (2013.01); *H04L 41/0226* (2013.01); *H04L 43/08* (2013.01); *H04L 67/10* (2013.01); *H04L 67/22* (2013.01); *G06F 9/44505* (2013.01)

(56) References Cited

U.S. PATENT DOCUMENTS

| | | | |
|---|---|---|---|
| 7,797,226 B2 | 9/2010 | Ram et al. | |
| 7,979,902 B2 | 7/2011 | Chakra et al. | |
| 8,065,201 B2 | 11/2011 | Perkowski | |
| 8,214,805 B2 | 7/2012 | Stewart | |
| 8,302,033 B2* | 10/2012 | Matas | G01C 21/20 715/863 |
| 8,365,144 B1 | 1/2013 | Webb | |
| 8,484,626 B2 | 7/2013 | Nagulu et al. | |
| 8,516,442 B2 | 8/2013 | Grechanik et al. | |
| 8,760,424 B2 | 6/2014 | Laubach | |
| 8,780,130 B2* | 7/2014 | Morris | G06F 9/4443 345/173 |
| 8,781,839 B1* | 7/2014 | Gazdzinski | G06Q 30/0251 369/30.01 |
| 8,910,078 B2 | 12/2014 | Sweeney et al. | |
| 9,135,751 B2 | 9/2015 | Moore et al. | |
| 9,152,295 B2 | 10/2015 | Lai et al. | |
| 9,197,736 B2 | 11/2015 | Davis et al. | |
| 9,239,672 B2* | 1/2016 | Kraut | G06F 3/0488 |
| 9,405,810 B2* | 8/2016 | Smith | G06F 3/0485 |
| 2002/0080171 A1 | 6/2002 | Laferriere et al. | |
| 2004/0123279 A1* | 6/2004 | Boykin | G06F 11/3644 717/158 |
| 2005/0188357 A1 | 8/2005 | Derks et al. | |
| 2006/0026557 A1 | 2/2006 | Petri | |
| 2006/0069635 A1 | 3/2006 | Ram et al. | |
| 2007/0043608 A1 | 2/2007 | May et al. | |
| 2007/0250822 A1 | 10/2007 | Yang et al. | |
| 2008/0092073 A1 | 4/2008 | Shih et al. | |
| 2008/0155515 A1 | 6/2008 | Stewart | |
| 2008/0263536 A1 | 10/2008 | Duggan et al. | |
| 2010/0082954 A1 | 4/2010 | Lim | |
| 2010/0235808 A1 | 9/2010 | Dayan et al. | |
| 2010/0325097 A1 | 12/2010 | Er et al. | |
| 2012/0144286 A1* | 6/2012 | Bank | G06F 17/241 715/230 |
| 2012/0151360 A1 | 6/2012 | Molander et al. | |
| 2012/0210236 A1 | 8/2012 | Prasad | |
| 2012/0226987 A1 | 9/2012 | Wie et al. | |
| 2013/0117731 A1 | 5/2013 | LeSuer et al. | |
| 2013/0125064 A1 | 5/2013 | Ebina et al. | |
| 2014/0101640 A1 | 4/2014 | Romdhane | |
| 2014/0215343 A1 | 7/2014 | Ligman et al. | |
| 2014/0325364 A1* | 10/2014 | Tee | H04L 41/065 715/736 |
| 2014/0365935 A1 | 12/2014 | Moha et al. | |
| 2016/0217110 A1* | 7/2016 | Parag | G06F 3/04842 |

OTHER PUBLICATIONS

Shah et al., Reverse-engineering user interfaces to facilitateporting to and across mobile devices and platforms, Oct. 2011, 5 pages.*
Ligman et al., "Automatic Extraction, Modeling, and Code Mapping of Application User Interface Display Screens and Components," U.S. Appl. No. 14/705,109, filed May 6, 2015, 53 pages.
Ligman et al., "Automatic Extraction, Modeling, and Code Mapping of Application User Interface Display Screens and Components," U.S. Appl. No. 14/705,200, filed May 6, 2015, 52 pages.
Notice of Allowance, dated Apr. 15, 2015, regarding U.S. Appl. No. 13/752,955, 9 pages.
Cui et al., "A Gui Based Lidar Data Processing System for Model Generation and Mapping," Proceedings of the 1st ACM SIGSPATIAL International Workshop on MapInteraction (MapInteract '13), Nov. 2013, pp. 40-43.
Song et al., "Rapid GUI Development on Legacy Systems: A Runtime Model-Based Solution," Proceedings of the 7th Workshop on Models@run.time (MRT '12), Oct. 2012, pp. 25-30.
Office action dated Jan. 27, 2015, regarding U.S. Appl. No. 13/752,955, 13 pages.
International Search Report and Written Opinion dated May 20, 2014, regarding application No. PCT/US2013/075535 filed on Dec. 17, 2013, 3 pages.
Office Action, dated Nov. 2, 2015, regarding U.S. Appl. No. 14/705,109, 13 pages.
Office Action, dated Nov. 27, 2015, regarding U.S. Appl. No. 14/705,200, 11 pages.
Krunic et al., "An approach to model driven development and automatic source code generation of GUI controls," IEEE 11th International Symposium on Intelligent Systems and Informatics (SISY), Sep. 2013, pp. 63-68.
Kull et al., "Automatic GUI Model Generation: State of the Art," IEEE 23rd International Symposium onSoftware Reliability Engineering Workshops (ISSREW), Nov. 2012, pp. 207-212.
Yuan et al., "Generating Event Sequence-Based Test Cases Using GUI Runtime State Feedback," IEEE Transaction on Software Engineering, vol. 36, No. 1, Oct. 2009, pp. 81-95.
Notice of Allowance, dated Feb. 10, 2016, regarding U.S. Appl. No. 14/705,109, 10 pages.
Paskalev et al., "Runtime Generation of a User Interface, Described in a Database," Proceedings of the International Conference on Computer Systems and Technologies and Workshop for PhD Students in Computing (CompsysTech'09), Jun. 2009, 6 pages.
Chang, "Using Graphical Representation of User Interfaces as Visual References," Proceedings of the 24th Annual ACM Symposium Adjunct on User Interface Software and Technology (UIST—11), Oct. 2011, pp. 27-30.
Notice of Allowance, dated Mar. 16, 2016, regarding U.S. Appl. No. 14/705,200, 10 pages.

* cited by examiner

DISPLAY SCREEN DATA PACKAGE 500

- User Interface Display Screen containing three components: — 502
  {"0, 110, 480, 182":"TextView", — 504
  "73, 55, 258, 92":"TextView", — 506
  "19,50,67,98":"ImageView"} — 508

- Component and event data — 510
  {"componentid":"0110480182",
  "layoutid":"AppNavHomeActivity.png",
  "events":"{onMeasure:event,
           onClick:event,
           onTrackballEvent:event }",
  "componenttype":"Textview"}

FIG. 5

RUNTIME TRACKING AND ENFORCEMENT POLICY 600

{"application":"com.yourcompany.Tabster",
"device":"640960",
"globals":{"location":"1","network":"1"}
"views":[
    {"viewid":"ImageView",
     "components":[{"componentid":"0643001707",
                    "track":"1",
                    "disable":"0"},
                   {"componentid":"194432254480",
                    "track":"0",
                    "disable":"1"}
    }]
}

FIG. 6

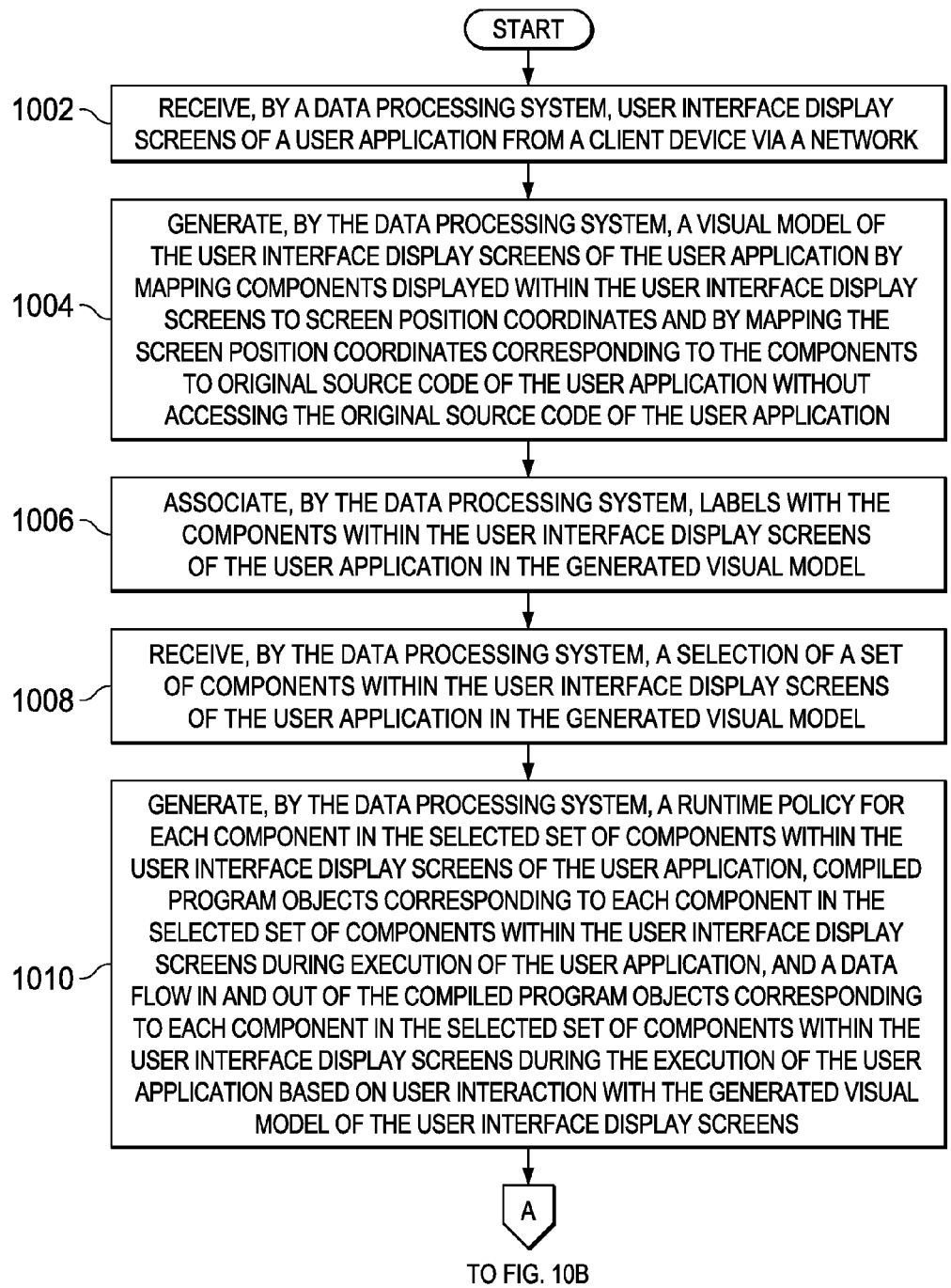

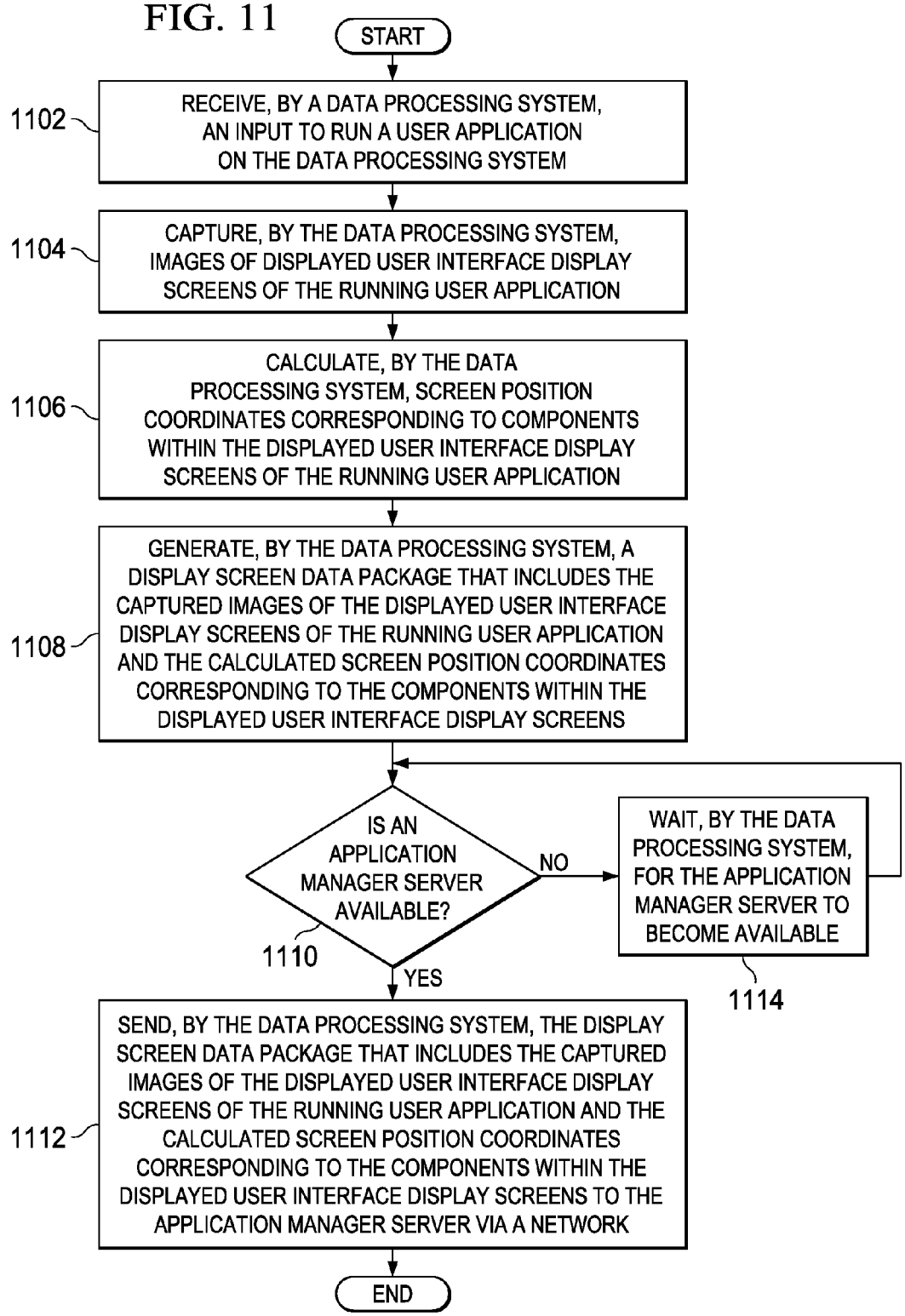

AUTOMATIC EXTRACTION, MODELING, AND CODE MAPPING OF APPLICATION USER INTERFACE DISPLAY SCREENS AND COMPONENTS

This application is a continuation of U.S. patent application Ser. No. 13/752,955, filed on Jan. 29, 2013.

BACKGROUND

1. Field

The disclosure relates generally to application management and more specifically to the automatic extraction, modeling, and code mapping of application user interface display screens and components within the display screens in order to track and log data generated by user activities within the application. The tracked and logged data may be a representation of one or more compiled program objects that represent user interface components during execution of the application and internal attributes of those compiled program objects and/or data that flows in and out of the compiled program objects during execution of the application. The user interface display screens provide a visualization to associate and to control functionality of selected components by acting on the compiled program objects within the application.

2. Description of the Related Art

Companies are increasingly supporting business applications, which cover a wide range of functionality, running on mobile data processing devices, such as smart phones, personal digital assistants, handheld computers, and laptop computers. Also, companies are adopting business application stores and allowing employees to bring their own personal mobile data processing devices to work. Thus, companies desiring to protect their computing infrastructures may want to manage these business applications and their distribution on employees' personal mobile data processing devices.

SUMMARY

According to one illustrative embodiment, a computer system and a computer program product for managing user applications is provided. A visual model of user interface display screens of a user application is generated by mapping components displayed within the user interface display screens to screen position coordinates and by mapping the screen position coordinates corresponding to the components to original source code of the user application without accessing the original source code of the user application. A runtime policy for each component in a selected set of components within the user interface display screens of the user application is generated based on user interaction with the generated visual model of the user interface display screens. The generated runtime policy for each component in the selected set of components within the user interface display screens of the user application is sent to a client device via a network. Activity of each component in the selected set of components within the user interface display screens of the user application running on the client device is tracked using data that is tracked and logged on the client device based on the generated runtime policy on each component in the selected set of components.

According to another illustrative embodiment, a data processing system and computer program product for managing user applications is provided. Images of displayed user interface display screens of a running user application on the data processing system are captured. An embedded instrumentation library in the running user application is used to capture the images of the displayed user interface display screens. Screen position coordinates are calculated corresponding to components within the displayed user interface display screens of the running user application. A display screen data package is generated that includes the captured images of the displayed user interface display screens of the running user application and the calculated screen position coordinates corresponding to the components within the displayed user interface display screens.

BRIEF DESCRIPTION OF THE SEVERAL VIEWS OF THE DRAWINGS

FIG. 5 is an example of a display screen data package in accordance with an illustrative embodiment;

FIG. 6 is an example of a runtime tracking and enforcement policy in accordance with an illustrative embodiment;

FIG. 10A and FIG. 10B are a flowchart illustrating a process for managing applications in accordance with an illustrative embodiment;

FIG. 11 is a flowchart illustrating a process for capturing user interface display screens in accordance with an illustrative embodiment;

DETAILED DESCRIPTION

Figure 1:
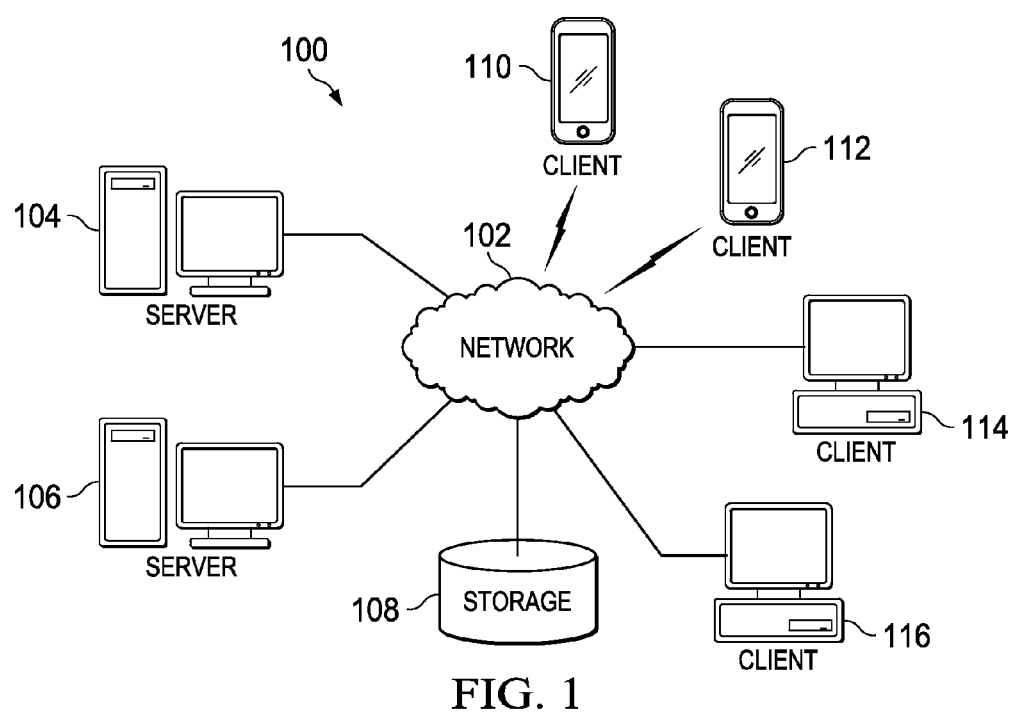
FIG. 1 is a pictorial representation of a network of data processing systems in which illustrative embodiments may be implemented.

As will be appreciated by one skilled in the art, aspects of the illustrative embodiments may be embodied as a computer system or computer program product. Accordingly, aspects of the illustrative embodiments may take the form of an entirely hardware embodiment, an entirely software embodiment (including firmware, resident software, microcode, etc.), or an embodiment combining software and hardware aspects that may all generally be referred to herein as a "circuit," "module," or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any physical medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of computer systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
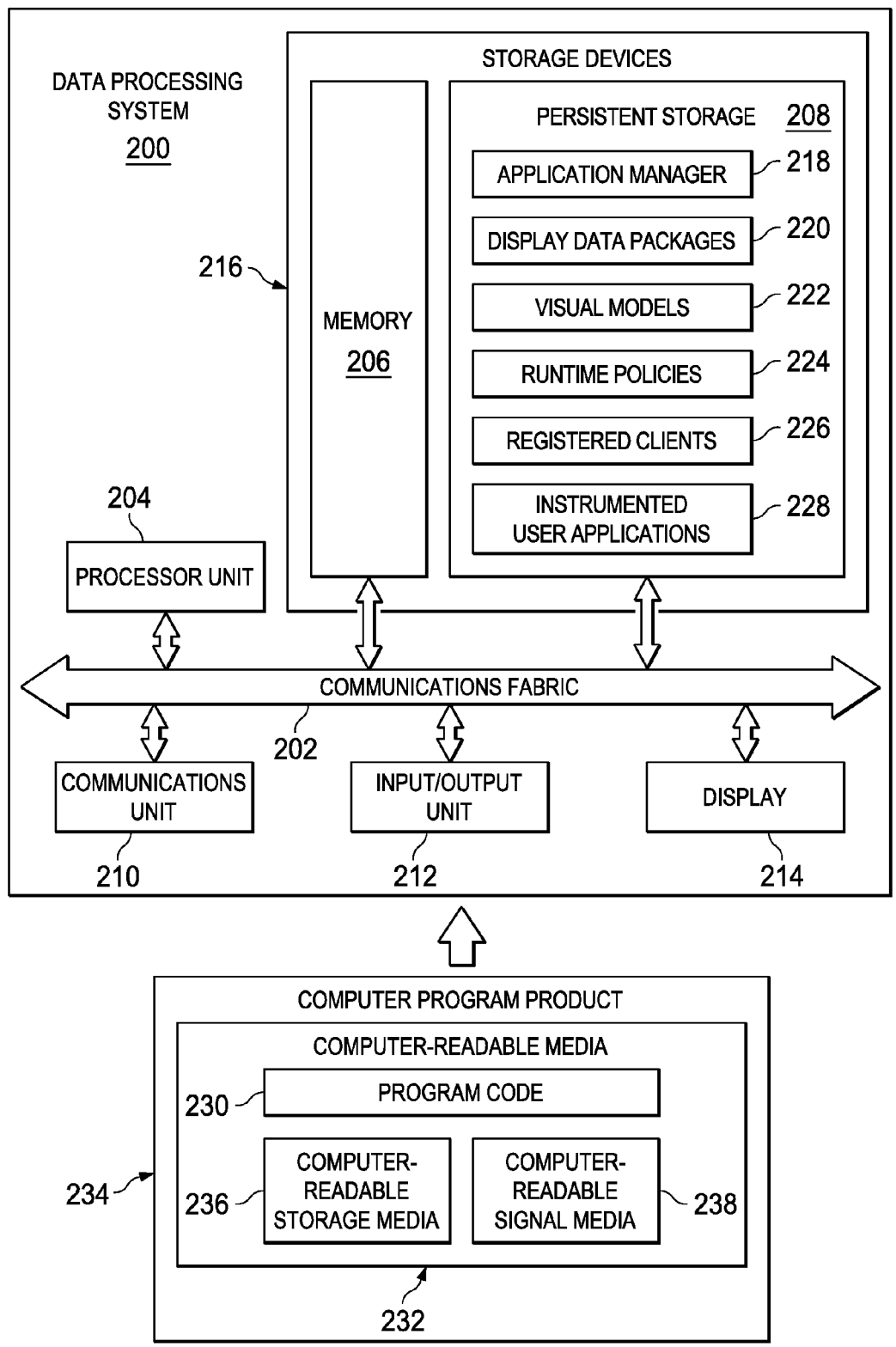
FIG. 2 is a diagram of a data processing system in which illustrative embodiments may be implemented.
Figure 3:
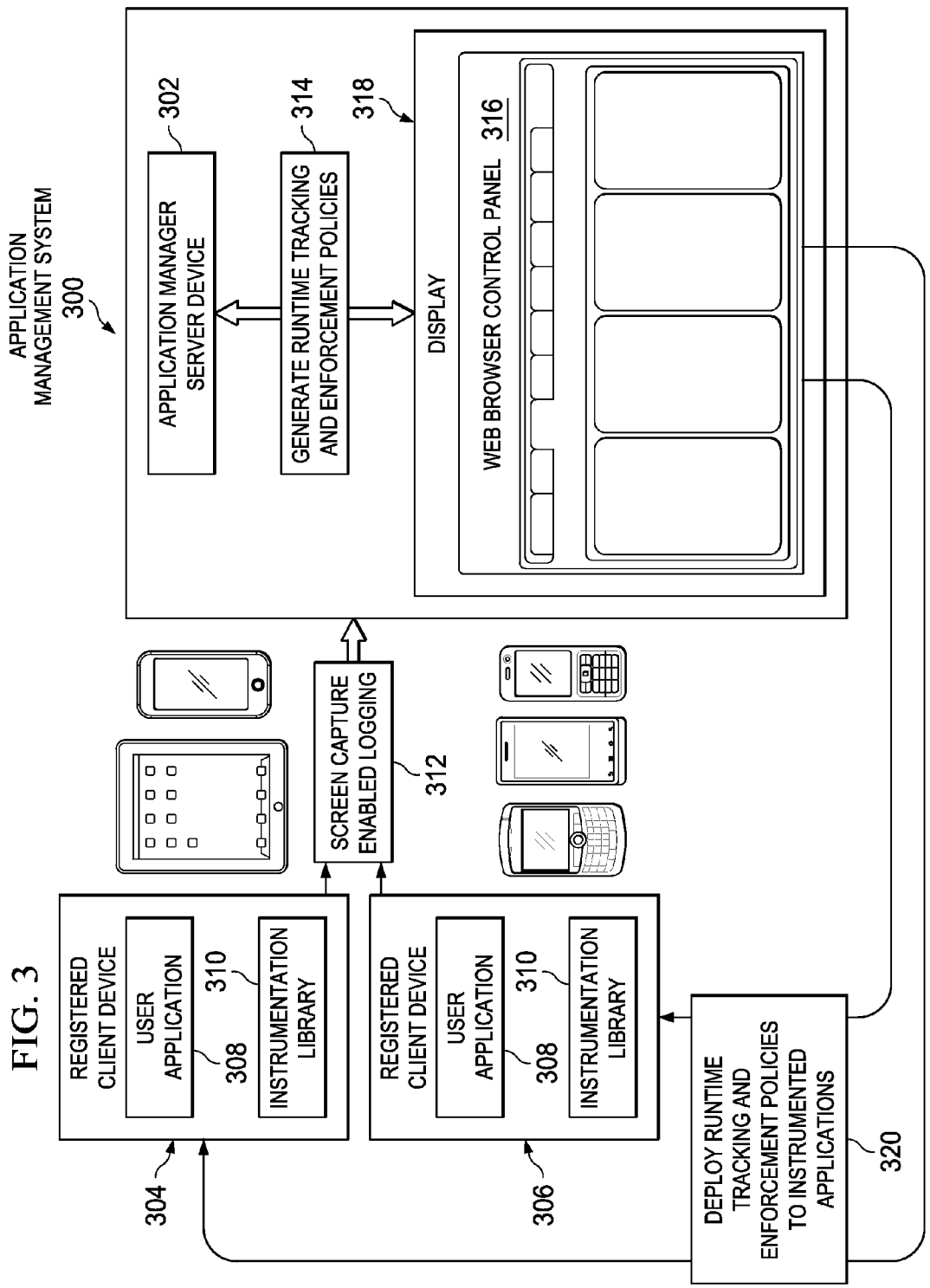
FIG. 3 is a diagram illustrating an example of an application management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other various devices connected together within network data processing system 100. Network 102 may include connections, such as wire communication links, wireless communication links, or fiber optic cables.

In the depicted example, server 104 and server 106 connect to network 102, along with storage unit 108. Server 104 and server 106 may be, for example, server computers with high speed connections to network 102. In addition, server 104 and/or server 106 may provide services for managing user applications located on client devices connected to network 102 by deploying runtime tracking and enforcement policies to the client devices to track activities and/or control functionality of the user applications. The runtime tracking and enforcement policies define which components of running user applications are to be tracked and logged. A component of a user application encapsulates, for example, a user interface component, such as an input button displayed within a user interface, and a set of one or more compiled program objects that make up and control the input button during execution of the user application. The set of compiled program objects represent the user interface component during execution of the user application. In addition, the runtime tracking and enforcement policies may define whether the functionality of particular components of the running user application are to be enabled or disabled, when the functionality is to be enabled or disabled, and where the functionality of the components are to enabled or disabled depending on a current location of a client device. For example, a runtime tracking and enforcement policy may define that a particular component of a business application may only be enabled or tracked during the business hours of 9:00 a.m. to 5:00 p.m. and only when the client device containing the business application is located on the premises of the business owning the business application.

Clients 110, 112, 114, and 116 also connect to network 102. Clients 110, 112, 114, and 116 are registered clients to server 104 and/or server 106. In addition, clients 110, 112, 114, and 116 include one or more types of user applications managed by server 104 and/or server 106. In the depicted example, server 104 and/or server 106 may provide information, such as boot files, operating system images, and user applications to clients 110, 112, 114, and 116. Further, server 104 and/or server 106 may inject the user applications of clients 110, 112, 114, and 116 with instrumentation libraries that are used to track and control the user applications. Server 104 and/or server 106 may use, for example, a byte code injector to inject the instrumentation libraries into the user applications.

Clients 110 and 112 may be, for example, mobile data processing systems, such as cellular telephones, smart phones, personal digital assistants, gaming devices, or handheld computers, with wireless communication links to network 102. Clients 114 and 116 may be, for example, computers, such as personal computers, network computers, or portable computers, such as laptop computers, with wire communication links to network 102. However, it should be noted that clients 110, 112, 114, and 116 may represent any combination of computers and mobile data processing systems connected to network 102 by wire communication links and/or wireless communication links.

Storage unit 108 is a network storage device capable of storing data in a structured or unstructured format. Storage unit 108 may provide, for example, storage of: identification numbers of a plurality of registered client devices; identification numbers of a plurality of user applications; user applications; instrumentation libraries for the user applications; visual models of the user applications; captured user interface display screens of the user applications including screen position coordinates of visual components within the user interface display screens; identification labels of the visual components within the user interface display screens; runtime tracking and enforcement policies for the visual components within the user interface display screens; location tracking information, such as global positioning system (GPS) data, for registered client devices; program object data representing a structure of the application; and user application usage histories. Further, storage unit 108 may store other data, such as authentication data that may include user names, passwords, and/or biometric data associated with a plurality of users and system administrators of the application management system.

Moreover, it should be noted that network data processing system 100 may include any number of additional server devices, client devices, and other devices not shown. Program code located in network data processing system 100 may be stored on a computer recordable storage medium and downloaded to a computer or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), an internet, or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a non-statutory propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores application manager 218, display screen data packages 220, visual models 222, runtime policies 224, registered clients 226, and instrumented user applications 228. Application manager 218 is a software program that instruments, manages, tracks, and controls instrumented user applications 228. Application manager 218 instruments instrumented user applications 228 with instrumentation libraries that include runtime policies 224. Runtime policies 224 are a plurality of runtime tracking and enforcement policies that data processing system 200 generates based on user interaction with visual models 222 to track and log compiled program objects that represent components displayed within user interface display screens during execution of instrumented user applications 228, data flow in and out of those compiled program objects during execution of instrumented user applications 228, and activities of the components displayed within user interface display screens of instrumented user applications 228. Moreover, runtime policies 224 may control functionality of selected components of instrumented user applications 228. Further, runtime policies 224 may also specify an enforcement model triggering behavior in a specific component mapped to one or more components in a selected set of components within the user interface display screens.

Data processing system 200 deploys instrumented user applications 228 to registered clients 226. It should be noted that instrumented user applications 228 may represent a plurality of the same type of software application or may represent a plurality of different types of software applications. Registered clients 226 are client devices, such as clients 110-116 in FIG. 1, which are registered with data processing system 200 to receive user application management services provided by data processing system 200.

After registered clients 226 receive instrumented user applications 228, instrumented user applications 228 send data processing system 200 display screen data packages 220 to data processing system 200. A display screen data package may include, for example, captured images of displayed user interface display screens of a running instrumented user application, screen position coordinates corresponding to components within the displayed user interface display screens, and program object data. The program object data may include, for example, structural data about an instrumented user application, such as associations between compiled program objects and corresponding components displayed within user interface display screens during execution of the instrumented user application and internal attributes of the compiled program objects, and data flow in and out of the compiled program objects during execution of the instrumented user application. In addition, a display screen data package may also include names and/or identification numbers of the captured user interface display screens for identification.

Subsequent to receiving display screen data packages 220 from registered clients 226, data processing system 200 generates visual models 222 of the captured user interface display screens using the information within display screen data packages 220. Visual models 222 may be, for example, hypertext markup language (HTML) image maps of the captured user interface display screens and corresponding components. Thus, a visual model may be a hierarchical view tree structure. Each node in the view tree structure corresponds to a component within the user interface display screen, along with the component's compiled program objects, and for each node, a runtime policy is defined specifying how the component and its compiled program objects corresponding to the node should behave or function. Furthermore, each node is linked to the original source code in the user application corresponding to that particular component represented by that node.

A visual model illustrates or depicts all user interface display screens of an instrumented user application that may be presented to a user and all activities that may be performed by the user on the instrumented user application. Data processing system 200 may, for example, display visual models 222 in a web-based control panel for users of data processing system 200 to create runtime policies 224 for selected components within the captured user interface display screens. In other words, visual models 222 are interactive models.

Communications unit 210, in this example, provides for communication with other data processing systems or devices via a network, such as network 102 in FIG. 1. Communications unit 210 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 230 is located in a functional form on computer readable media 232 that is selectively removable and may be loaded onto or transferred to data processing system 200 for running by processor unit 204. Program code 230 and computer readable media 232 form computer program product 234. In one example, computer readable media 232 may be computer readable storage media 236 or computer readable signal media 238. Computer readable storage media 236 may include, for example, an optical or magnetic disc that is inserted or placed into a drive or other device that is part of persistent storage 208 for transfer onto a storage device, such as a hard drive, that is part of persistent storage 208. Computer readable storage media 236 also may take the form of a persistent storage, such as a hard drive, a thumb drive, or a flash memory that is connected to data processing system 200. In some instances, computer readable storage media 236 may not be removable from data processing system 200.

Alternatively, program code 230 may be transferred to data processing system 200 using computer readable signal media 238. Computer readable signal media 238 may be, for example, a propagated data signal containing program code 230. For example, computer readable signal media 238 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 230 may be downloaded over a network to persistent storage 208 from another device or data processing system through computer readable signal media 238 for use within data processing system 200. For instance, program code stored in a computer readable storage media in a server data processing system may be downloaded over a network from the server to data processing system 200. The data processing system providing program code 230 may be a server computer, a client computer, or some other device capable of storing and transmitting program code 230.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 236 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that with companies offering such a wide range of mobile business applications, mobile data processing devices, and services, these companies needed a way to protect their business data on these mobile data processing devices and their networked resources. In addition, these companies needed a way to enable and disable not only the business applications, but also the sensitive components and data displayed by these business applications. Thus, illustrative embodiments provide a system, language, and protocol for modeling and controlling applications after the applications have been compiled. A post-compile, pre-deploy system provides security and application management before releasing these mobile applications to mobile data processing systems of employees of an enterprise. The ability to manage and control the applications after they have been deployed on mobile data processing devices gives an enterprise an advantage in protecting the computing infrastructure and services used by these applications.

Illustrative embodiments focus on mobile application runtime policy enforcement, security, and mobile application distribution in an enterprise. Illustrative embodiments manage enterprise mobile applications using an application manager server to perform the following tasks without examining or modifying the original source code of an application because examining the original source code of an application may not always be possible and may require the expertise of an application manager with diverse programming and technical skills. The application manager server examines captured user interface display screens of a user application after the user application has been compiled and before the user application is released to mobile data processing devices. The application manager server examines visual components within the captured user interface display screens of a user application and builds a visual model of the application user interface display screen components, compiled program objects corresponding to the components displayed within user interface display screens during execution of the user application, and other data processing system components, such as a global positioning system component, a camera component, and a network communication component.

The application manager server generates a runtime tracking and enforcement policy for one or more selected components of the user application based on user interaction with the selected components of the captured user interface display screens. The application manager server may then deploy the generated runtime tracking and enforcement policies to the user application at release and/or at post release time. These runtime tracking and enforcement policies may track and log activities of the running application and/or control functionality of the application. Further, the application manager server may deploy updates or modifications to the runtime tracking and enforcement policies after the user application has been released to registered mobile data processing client devices.

The application manager server injects an instrumentation library into the user applications, which is able to interface between the native operating systems of the client devices and the code of the user applications. The instrumentation library is programmed to capture and transmit the user interface display screens of a running user application to the application manager server or to abstract the user interface display screens of a static user application by examining the source code or the byte code of the static user application and then transmit the abstracted user interface display screens to the application manager server. In addition, the instrumentation library may or may not include the generated runtime tracking and enforcement polices.

Thus, illustrative embodiments provide a computer system and computer program product for managing user applications. A computer generates a visual model of user interface display screens of a user application by mapping components displayed within the user interface display screens to screen position coordinates and by mapping the screen position coordinates corresponding to the components to original source code of the user application without accessing the original source code of the user application. The computer generates a runtime policy for each component in a selected set of components within the user interface display screens of the user application based on user interaction with the generated visual model of the user interface display screens. The computer sends the generated runtime policy for each component in the selected set of components within the user interface display screens of the user application to a client device via a network. The computer tracks activity of each component in the selected set of components within the user interface display screens of the user application running on the client device using data that is tracked and logged on the client device based on the generated runtime policy for each component in the selected set of components.

With reference now to FIG. 3, a diagram illustrating an example of an application management system is depicted in accordance with an illustrative embodiment. Application management system 300 may be, for example, implemented in a network of data processing systems, such as network data processing system 100 in FIG. 1. Application management system 300 is a system of hardware and software components that monitor, track, and control selected components within user interface display screens of instrumented user applications located on client devices, such as clients 110-116 in FIG. 1.

Application management system 300 includes application manager server device 302, registered client device 304 and registered client device 306. Application manager server device 302 may be, for example, server 104 in FIG. 1 or data processing system 200 in FIG. 2. In addition, application manager server device 302 may represent a plurality of application manager server devices.

Application manager server device 302 provides application management services to registered client devices 304 and 306. Application manager server device 302 injects user application 308 with instrumentation library 310 prior to application manager server device 302 deploying user application 308 to registered clients 304 and 306. It should be noted that even though in this example registered client devices 304 and 306 include the same user application (i.e., user application 308), registered clients 304 and 306 may include different user applications.

Instrumentation library 310 is programmed to enable screen capture logging, such as screen capture enabled logging 312, which is sent to application manager server device 302. In other words, instrumentation library 310 captures displayed user interface display screens on running user application 308 and then transmits the captured user interface display screens to application manager server device 302 for processing. The captured user interface display screens include all visual components within the user interface display screens and the visual components' calculated screen position coordinates within the user interface display screens. Alternatively, instrumentation library 310 may abstract the user interface display screens of user application 308 by examining the compiled program objects that correspond to components within the user interface display screens of user application 308, the original source code of user application 308, or the byte code of user application 308 and then transmit the abstracted user interface display screens to application manager server device 302.

After receiving the user interface display screens of user application 308, application manager server device 302 generates runtime tracking and enforcement policies 314 based on user interaction with selected components of the user interface display screens displayed in web browser control panel 316 in display 318 of application manager server device 302. Web browser control panel 316 represents a plurality of different displays used by a system administrator of application manager server device 302 to generate runtime policies for selected components of the user interface display screens to track and/or control the selected components, compiled program objects that correspond to the selected components during execution of user application 308, and data flow in and out of the corresponding compiled program objects during the execution of user applications 308. Subsequently, application manager server device 302 deploys the generated runtime tracking and enforcement policies to registered clients 304 and 306, such as deploy runtime tracking and enforcement policies to instrumented applications 320. Registered clients 304 and 306 update instrumentation library 310 with the newly deployed runtime tracking and enforcement policies. Instrumentation library 310 enforces the runtime policies on user application 308 to track and/or control specific components of the user interface display screens of user application 308, the compiled program objects that correspond to the specified components during the execution of user application 308, and the data flow in and out of the corresponding compiled program objects during the execution of user applications 308.

Figure 4:
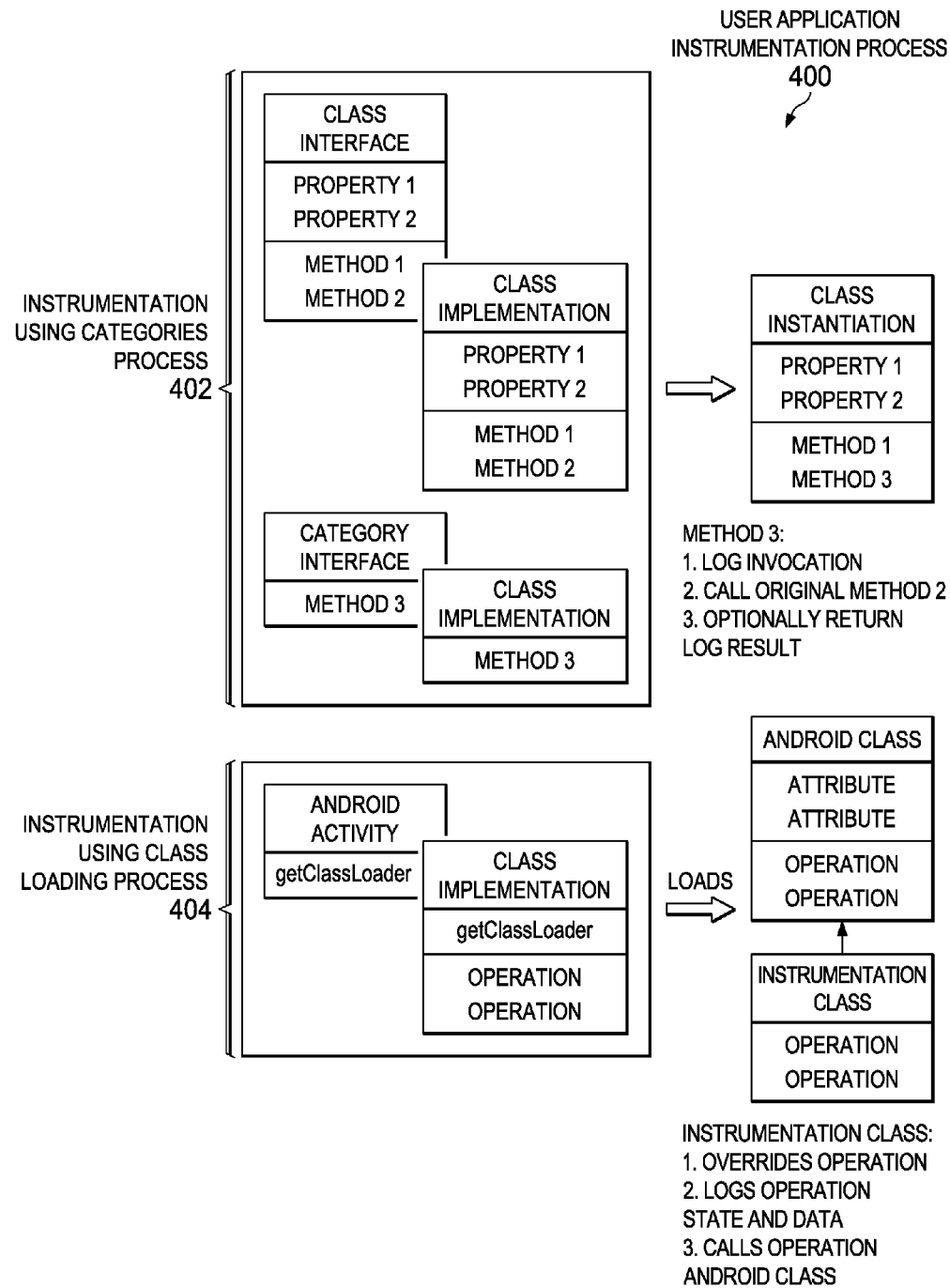
FIG. 4 is a diagram illustrating examples of user application instrumentation processes in accordance with an illustrative embodiment.

With reference now to FIG. 4, a diagram illustrating examples of user application instrumentation processes is depicted in accordance with an illustrative embodiment. User application instrumentation process 400 is a process for injecting a user application, such as user application 308 in FIG. 3, with an instrumentation library, such as instrumentation library 310 in FIG. 3. The instrumentation library includes runtime tracking and enforcement policies, such as runtime policies 224 in FIG. 2.

User application instrumentation process 400 may inject the user application with the instrumentation library with minimal to no source code modification of the user application. As a result, illustrative embodiments do not require application developers to manually annotate the source code of the user application or to issue special system commands to enable enforcement of the runtime policies. The instrumentation library also collects and transmits user interface display screens of the user application to an application manager server, such as application manager server device 302 in FIG. 3.

In this example, user application instrumentation process 400 includes two different types of user application instrumentation processes: 1) instrumentation using categories process 402; and 2) instrumentation using class loading process 404. Of course it should be noted that illustrative embodiments are not limited to using only the two user application instrumentation processes above, but also may utilize other types of instrumentation processes to instrument the user application as well.

Instrumentation using categories process 402 injects the instrumentation library into the user application via an X-code linker during the user application's compilation and linking stages. Instrumentation using categories process 402 replaces, for example, method 2 with method 3. Method 3 may, for example, invoke logging of user interface display screen activities, call original method 2, and optionally return logging results.

Instrumentation using class loading process 404 does not require any access to the user application's source code. Instrumentation using class loading process 404 injects the instrumentation library into the user application via JAVA® bytecode rewriting without any need for source code access and without any need for relinking and recompiling of the user application. Instrumentation using class loading process 404 overrides, for example, "Operation," logs the "Operation" state and data, and calls the "Operation" class. In other words, each selected component within a particular user application model actually becomes a sub-classed instance of the component defined in the user application. This sub-classed instance of the component being a super set of the original component can query all information and data from the original component, which includes structural, layout, user-defined, and event information.

With reference now to FIG. 5, an example of a display screen data package is depicted in accordance with an illustrative embodiment. Display screen data package 500 may be, for example, one of display screen data packages 220 in FIG. 2. An instrumentation library, such as instrumentation library 310 in FIG. 3, embedded within a user application, such as user application 308 in FIG. 3, generates display screen data package 500. The instrumentation library captures displayed user interface display screens of a running user application and calculates screen position coordinates of each visual component within the captured user interface display screens.

In this example, display screen data package 500 includes one captured user interface display screen with three visual components, such as user interface display screen containing three components 502. The three components are 1) "TextView" 504 with calculated screen position coordinates of "0, 110, 480, 182"; 2) "TextView" 506 with calculated screen position coordinates of "73, 55, 258, 92"; and 3) "ImageView" 508 with calculated screen position coordinates of "19, 50, 67, 98". Also in this example, display screen data package 500 includes component and event data 510. Component and event data 510 includes a component identification number or label, a user interface display screen identification name, events or activities of the identified component that are currently monitored and tracked, and a type of the identified component.

However, it should be noted that display screen data package 500 is only intended as an example and not as a limitation on illustrative embodiments. In other words, display screen data package 500 may include more or less information. Further, display screen data package 500 may include data for a plurality of user interface display screens associated with a user application.

With reference now to FIG. 6, an example of a runtime tracking and enforcement policy is depicted in accordance with an illustrative embodiment. Runtime tracking and enforcement policy 600 may be, for example, one of runtime policies 224 in FIG. 2. An application manager server, such as application manager server device 302 in FIG. 3, generates runtime tracking and enforcement policy 600 based on user inputs within a control panel, such as web browser control panel 316 in FIG. 3.

Runtime tracking and enforcement policy 600 tracks and logs activities of selected components within user interface display screens of a user application, such as user application 308 in FIG. 3, compiled program objects corresponding to the selected components within user interface display screens during execution of the user application, and data flow in and out of the compiled program objects corresponding to the selected components during execution of the user application. In addition, runtime tracking and enforcement policy 600 controls functionality of selected components within the user interface display screens of the user application. In this example, runtime tracking and enforcement policy 600 includes identification of the user application associated with runtime tracking and enforcement policy 600; identification of the registered client device, such as registered client device 304 in FIG. 3, including the identified user application; identification of a location of the registered client device and identification of a network, such as network 102 in FIG. 1, that the registered client device is located within; identification of a selected user interface display screen of the identified user application; and identification of selected components that are to be tracked and/or controlled within the identified user interface display. Also in this example, runtime tracking and enforcement policy 600 enables tracking of a component with an identification label of "064300107" within user interface display screen "ImageView" and disables functionality of another component with an identification label of "194432254480" within the user interface display screen "ImageView".

However, it should be noted that runtime tracking and enforcement policy 600 is only intended as an example and not as a limitation on illustrative embodiments. In other words, runtime tracking and enforcement policy 600 may include data for any number of components, such as, for example, one to one thousand, within a user interface display screen.

Figure 7:
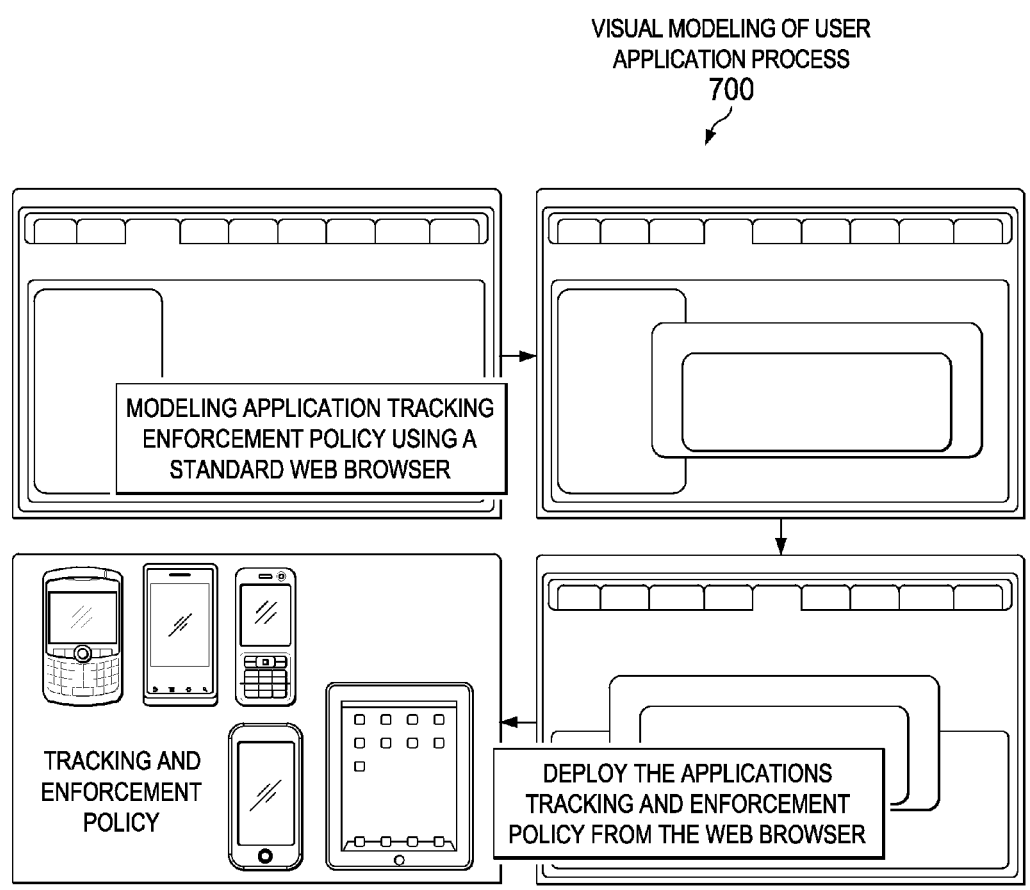
FIG. 7 is a diagram illustrating an example of visual modeling of a user application in accordance with an illustrative embodiment.

With reference now to FIG. 7, a diagram illustrating an example of visual modeling of a user application is depicted in accordance with an illustrative embodiment. Visual modeling of user application process 700 illustrates a method for modeling a user application, such as user application 308 in FIG. 3, by visual inspection by a user, such as a system administrator, using a standard web browser control panel, such as web browser control panel 316 in FIG. 3. A user of the web browser control panel utilizes the visual model of the user application to generate one or more runtime policies of control points, which can be enabled in an instrumentation library, such as instrumentation library 310 in FIG. 3, for selected components within user interface display screens of the modeled user application.

The user interacts with the user interface display screens, which are uploaded from a registered client device, such as registered client device 304 in FIG. 3, during a user interface display screen capture phase, by selecting and labeling components of the uploaded user interface display screens using, for example, a set of mouse clicks over the selected components. Selecting a component allows for tracking and/or control of the selected component. In addition, selected components within a user interface display screen are grouped into a tree structure, similar to the structure of the visual model of the user application.

The user utilizes the web browser control panel to publish or deploy the generated runtime tracking and enforcement policies, such as runtime policies 224 in FIG. 2, to one or more registered client devices that include the user application associated with the generated runtime tracking and enforcement policies. Generated or modified runtime tracking and enforcement policies may be deployed as often as needed.

Figure 8:
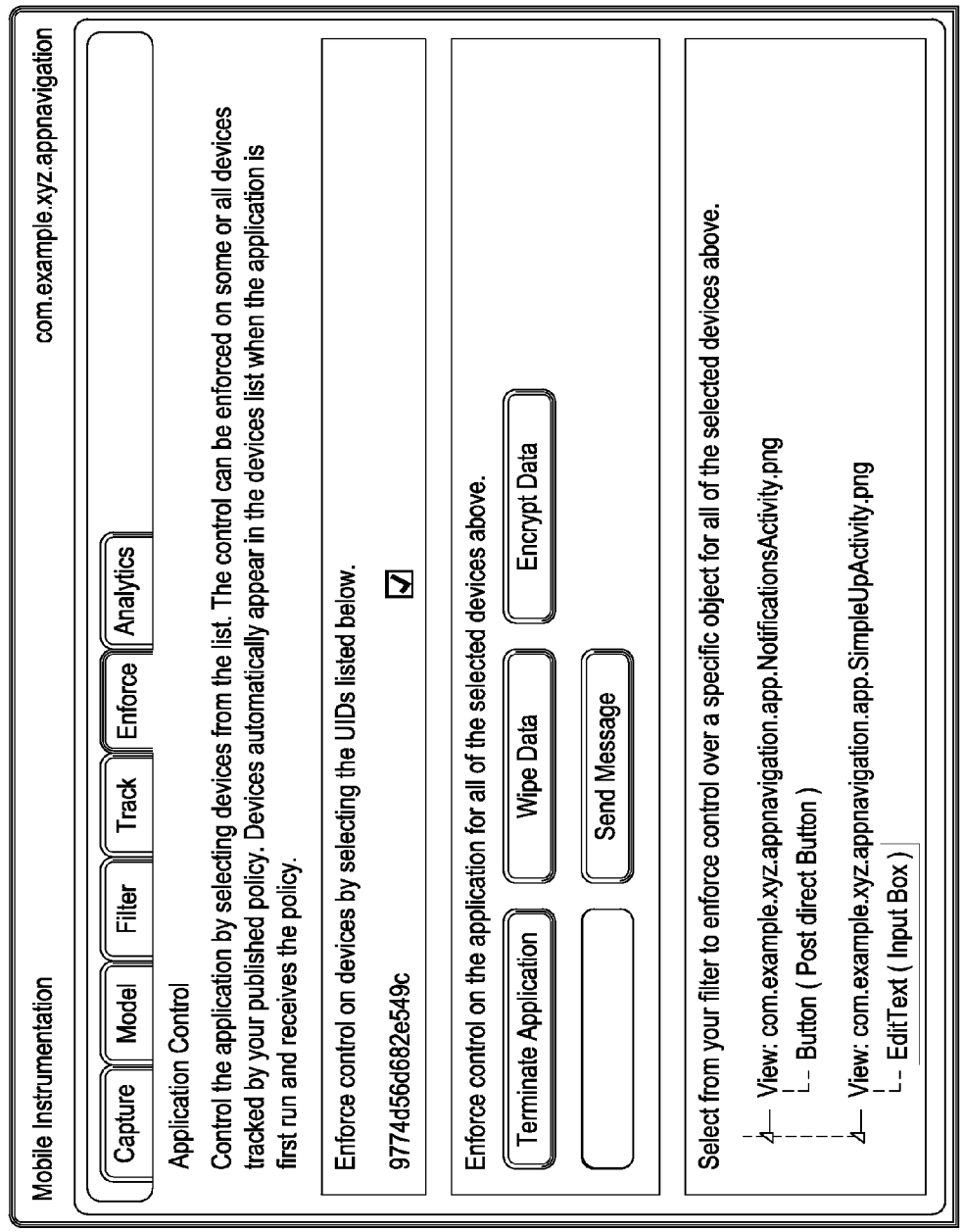
FIG. 8 is a diagram illustrating an example of a web browser user application control display in accordance with an illustrative embodiment.

With reference now to FIG. 8, a diagram illustrating an example of a web browser user application control display is depicted in accordance with an illustrative embodiment. Web browser user application control display 800 may be one of a plurality of web browser control displays within a web browser control panel, such as web browser control panel 316 in FIG. 3. A user, such as a system administrator, may utilize web browser user application control display 800 to enforce control of a user application, such as user application 308 in FIG. 3, located on one or more selected client devices, such as registered client devices 304 and 306 in FIG. 3. A registered client device may, for example, automatically appear in web browser user application control display 800 when a registered client device first runs the user application with an instrumented library, such as instrumented library 310 in FIG. 3, containing the runtime tracking and enforcement policies corresponding to components within user interface display screens of the user application.

Web browser user application control display 800 controls the user application at the component level. For example, controlling the user application may include enabling and disabling components within user interface display screens, removing component buttons or input areas from a running user application, changing colors and styles of components, and triggering events, such as clicking a button of a component. Controlling the user application may also include controlling global user application functionality, such as, for example, enabling and disabling network communication devices, cameras, or global positioning system devices located in the registered client devices. Further, controlling may include introducing a behavior that is based on conditionals, such as, for example, a current location of a registered client device based on global positioning system data.

Figure 9:
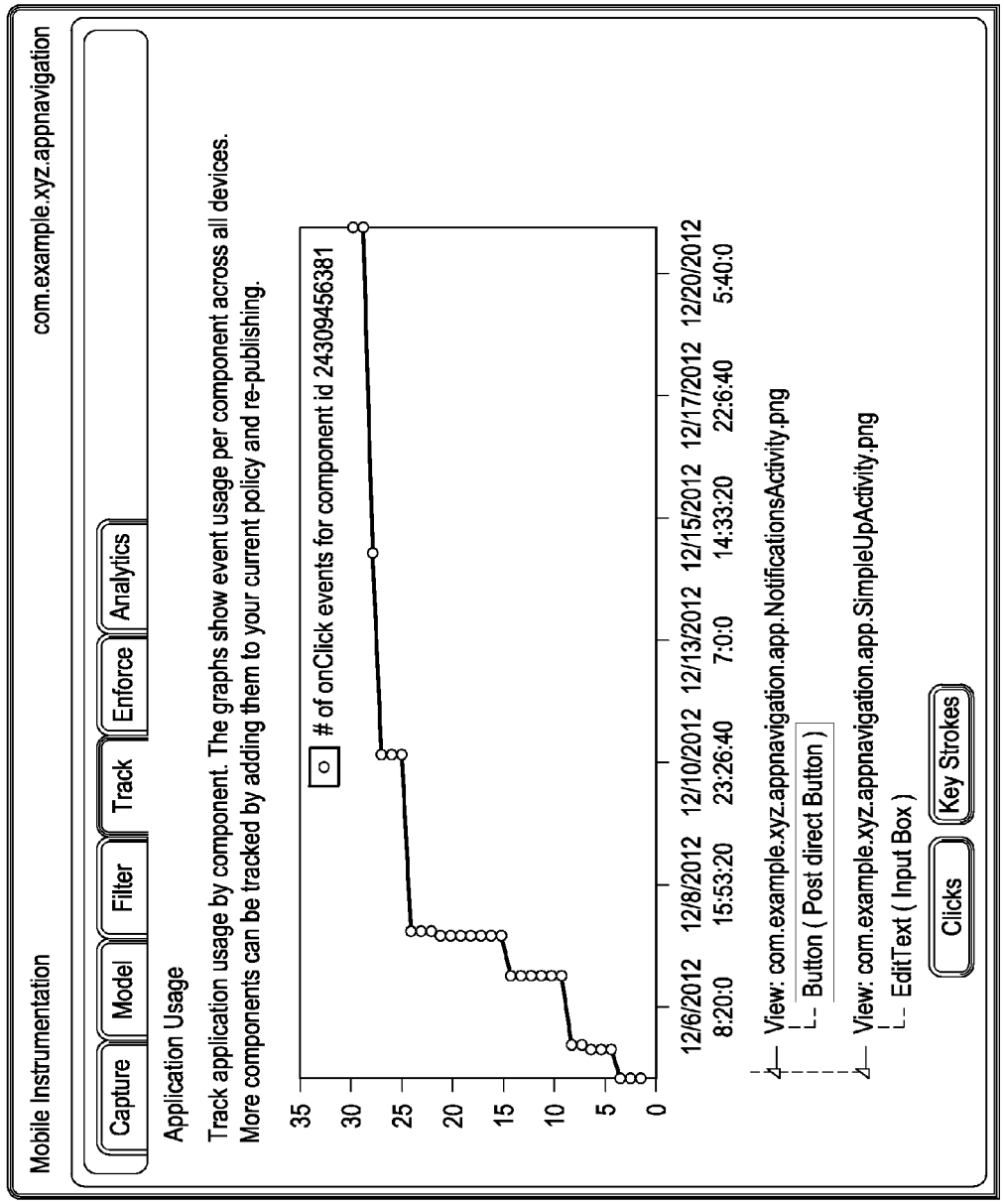
FIG. 9 is a diagram illustrating an example of a web browser user application usage display in accordance with an illustrative embodiment.

With reference now to FIG. 9, a diagram illustrating an example of a web browser user application usage display is depicted in accordance with an illustrative embodiment. Web browser user application usage display 900 may be one of a plurality of web browser control displays within a web browser control panel, such as web browser control panel 316 in FIG. 3. A user, such as a system administrator, may utilize web browser user application usage display 900 to track user application usage by component. The graph illustrated in web browser user application usage display 900 depicts event usage per component across all registered client devices, such as clients 110-116 in FIG. 1. In this example, "# of onClick events for component id 24309456381" is being tracked. However, it should be noted that web browser user application usage display 900 may track more components by a user adding the components to a set of one or more runtime tracking and enforcement policies.

Figure 10B:
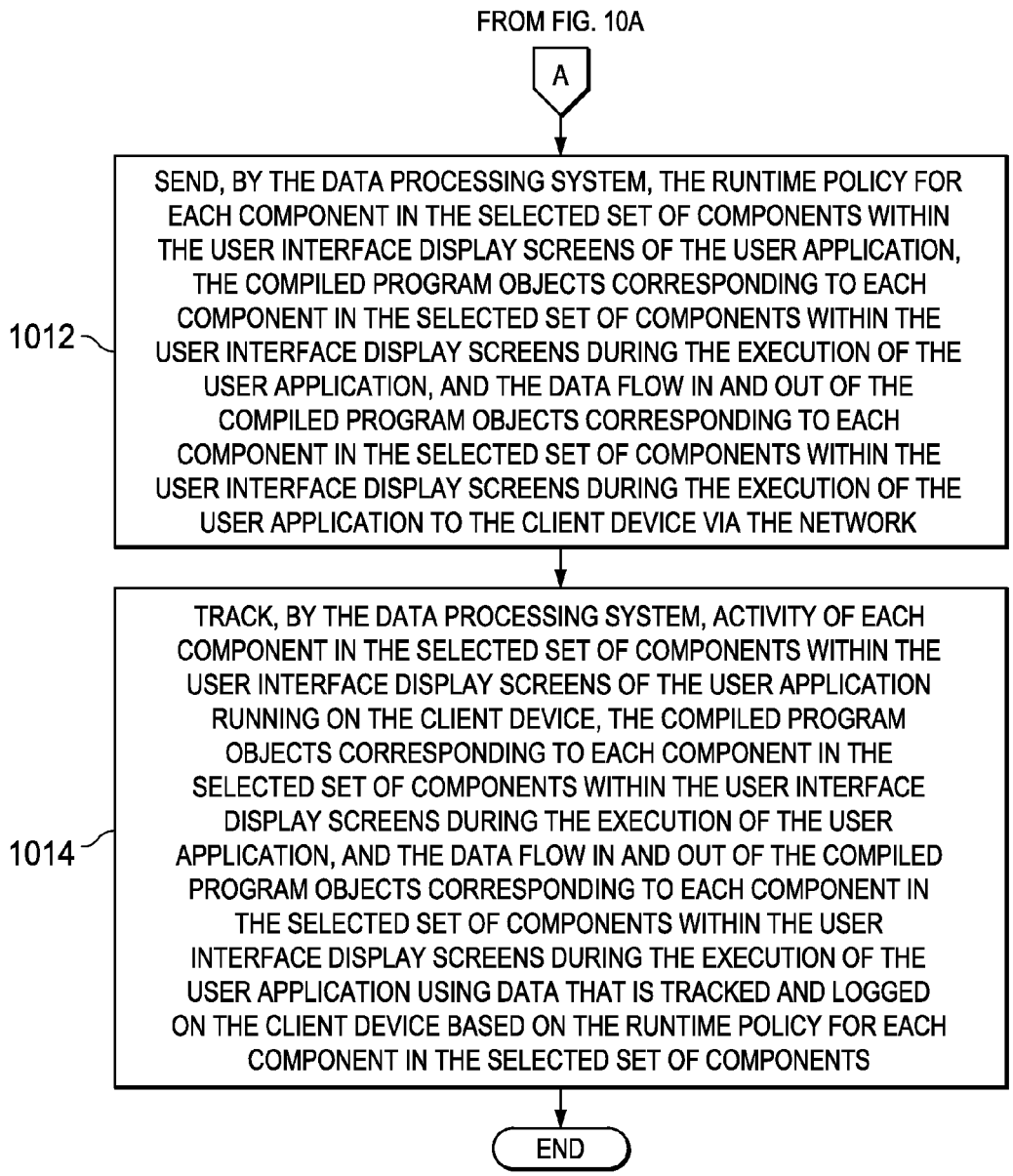

With reference now to FIG. 10A and FIG. 10B, a flowchart illustrating a process for managing applications is shown in accordance with an illustrative embodiment. The process shown in FIGS. 10A and 10B may be implemented in a server device, such as, for example, server 104 in FIG. 1 or application manager server 302 in FIG. 3. Also, the process shown in FIGS. 10A and 10B may be implemented in a data processing system, such as data processing system 200 in FIG. 2.

The process begins when the data processing system receives user interface display screens of a user application from a client device via a network (step 1002). Afterward, the data processing system generates a visual model of the user interface display screens of the user application by mapping components displayed within the user interface display screens to screen position coordinates and by mapping the screen position coordinates corresponding to the components to original source code of the user application without accessing the original source code of the user application (step 1004). In addition, the data processing system associates labels with the components within the user interface display screens of the user application in the generated visual model (step 1006). The data processing system uses the labels to uniquely identify the different components within the user interface display screens.

Subsequently, the data processing system receives a selection of a set of components within the user interface display screens of the user application in the generated visual model (step 1008). Then, the data processing system generates a runtime policy for each component in the selected set of components within the user interface display screens of the user application, compiled program objects corresponding to each component in the selected set of components within the user interface display screens during execution of the user application, and a data flow in and out of the compiled program objects corresponding to each component in the selected set of components within the user interface display screens during the execution of the user application based on user interaction with the generated visual model of the user interface display screens (step 1010). Further, the data processing system sends the runtime policy for each component in the selected set of components within the user interface display screens of the user application, the compiled program objects corresponding to each component in the selected set of components within the user interface display screens during the execution of the user application, and the data flow in and out of the compiled program objects corresponding to each component in the selected set of components within the user interface display screens during the execution of the user application to the client device via the network (step 1012). Furthermore, the data processing system tracks activity of each component in the selected set of components within the user interface display screens of the user application running on the client device, the compiled program objects corresponding to each component in the selected set of components within the user interface display screens during the execution of the user application, and the data flow in and out of the compiled program objects corresponding to each component in the selected set of components within the user interface display screens during the execution of the user application using data that is tracked and logged on the client device based on the runtime policy for each component in the selected set of components (step 1014). The process terminates thereafter.

With reference now to FIG. 11, a flowchart illustrating a process for capturing user interface display screens is shown in accordance with an illustrative embodiment. The process shown in FIG. 11 may be implemented in a client device, such as, for example, client 110 in FIG. 1 or registered client device 304 in FIG. 3.

The process begins when the data processing system receives an input to run a user application on the data processing system (step 1102). Afterward, the data processing system captures images of displayed user interface display screens of the running user application (step 1104). The data processing system may use, for example, an instrumentation library, which was injected into the user application prior to deployment of the user application to the data processing system, to capture the images of the displayed user interface display screens of the running user application. Alternatively, the instrumentation library may abstract the user interface display screens of the user application, while the user application is static or not running, by examining, for example, either the source code of the user application or the byte code of the user application.

In addition, the data processing system calculates screen position coordinates corresponding to components within the displayed user interface display screens of the running user application (step 1106). Further, the data processing system generates a display screen data package, such as display screen data package 500 in FIG. 5, that includes the captured images of the displayed user interface display screens of the running user application and the calculated screen position coordinates corresponding to the components within the displayed user interface display screens (step 1108). Subsequently, the data processing system makes a determination as to whether an application manager server, such as application manager server device 302 in FIG. 3, is available (step 1110).

If the data processing system determines that the application manager server is available, yes output of step 1110, then the data processing system sends the display screen data package that includes the captured images of the displayed user interface display screens of the running user application and the calculated screen position coordinates corresponding to the components within the displayed user interface display screens to the application manager server via a network, such as network 102 in FIG. 1 (step 1112). The process terminates thereafter. If the data processing system determines that the application manager server is not available, no output of step 1110, then the data processing system waits for the application manager server to become available (step 1114). Thereafter, the process returns to step 1112.

Figure 12:
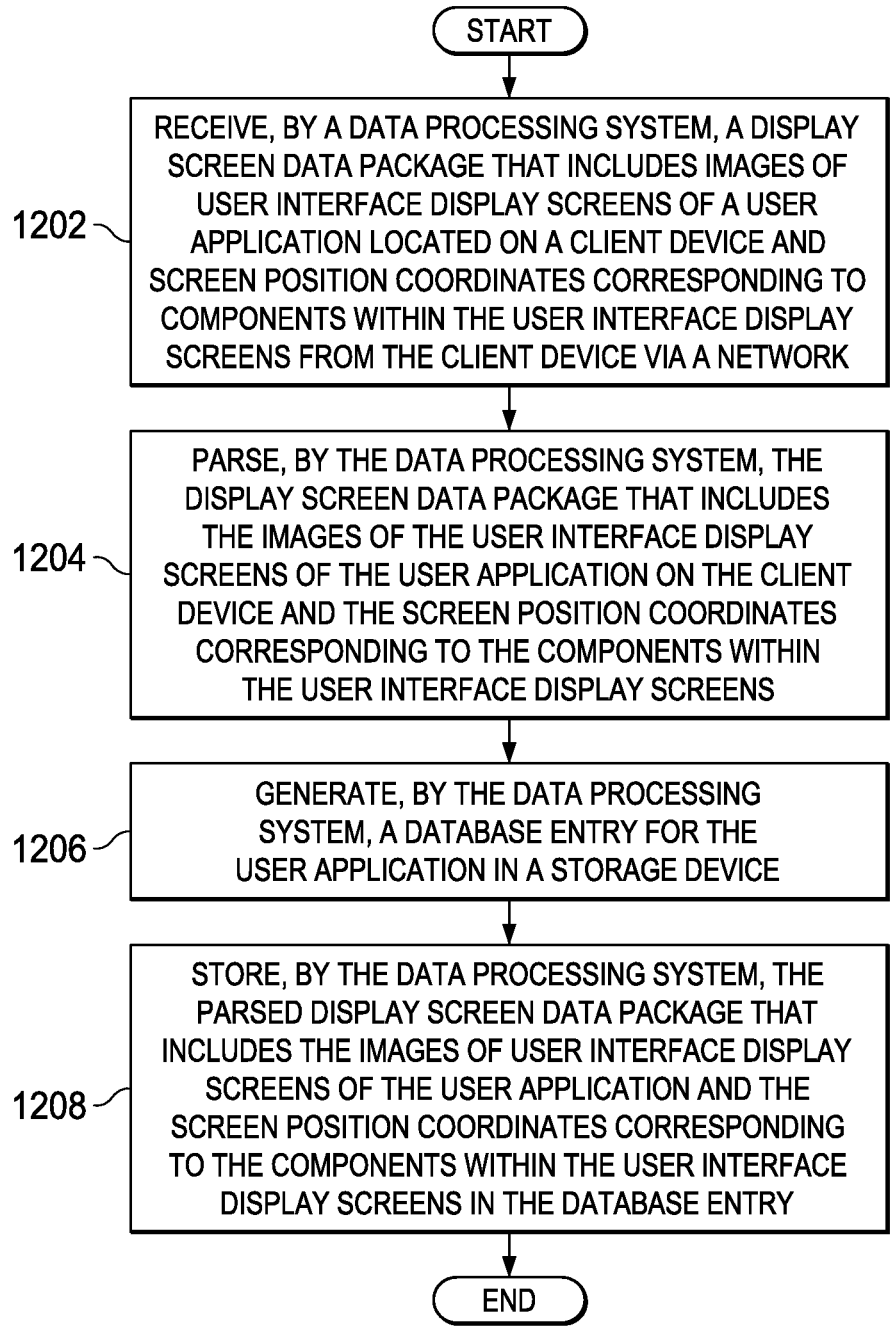
FIG. 12 is a flowchart illustrating a process for storing a display screen data package in accordance with an illustrative embodiment.

With reference now to FIG. 12, a flowchart illustrating a process for storing a display screen data package is shown in accordance with an illustrative embodiment. The process shown in FIG. 12 may be implemented in a server device, such as, for example, server 104 in FIG. 1 or application manager server device 304 in FIG. 3.

The process begins when the data processing system receives a display screen data package, such as display screen data package 500 in FIG. 5, that includes images of user interface display screens of a user application located on a client device and screen position coordinates corresponding to components within the user interface display screens from the client device via a network (step 1202). Afterward, the data processing system parses the display screen data package that includes the images of the user interface display screens of the user application on the client device and the screen position coordinates corresponding to the components within the user interface display screens (step 1204). The data processing system may parse the display screen data package to separate and identify each component within each of the different user interface display screens.

Then, the data processing system generates a database entry for the user application in a storage device, such as storage 108 in FIG. 1 (step 1206) if a database entry for the user application does not already exist. Furthermore, the data processing system stores the parsed display screen data package that includes the images of user interface display screens of the user application and the screen position coordinates corresponding to the components within the user interface display screens in the database entry for the user application (step 1208). The process terminates thereafter.

Figure 13:
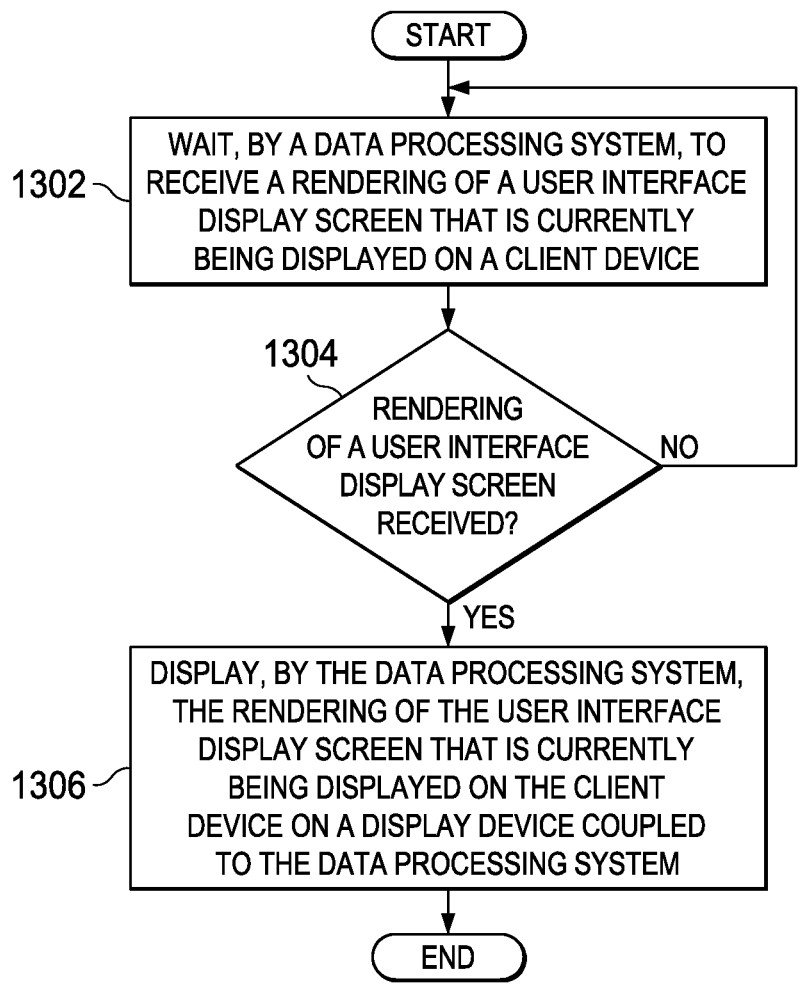
FIG. 13 is a flowchart illustrating a process for concurrently displaying a user interface display screen rendering in accordance with an illustrative embodiment.

With reference now to FIG. 13, a flowchart illustrating a process for concurrently displaying a user interface display screen rendering is shown in accordance with an illustrative embodiment. The process shown in FIG. 13 may be implemented in a server device, such as, for example, server 104 in FIG. 1 or application manager server device 304 in FIG. 3.

The process begins when the data processing system waits to receive a rendering of a user interface display screen that is currently being displayed on a client device, such as registered client device 304 in FIG. 3 (step 1302). The data processing system makes a determination as to whether a rendering of a user interface display screen has been received (step 1304). If the data processing system determines that a rendering of a user interface display screen has not been received, no output of step 1304, then the process returns to step 1302. If the data processing system determines that a rendering of a user interface display screen has been received, yes output of step 1304, then the data processing system displays the rendering of the user interface display screen that is currently being displayed on the client device on a display device, such as display 318 in FIG. 3, coupled to the data processing system (step 1306). The process terminates thereafter.

Figure 14:
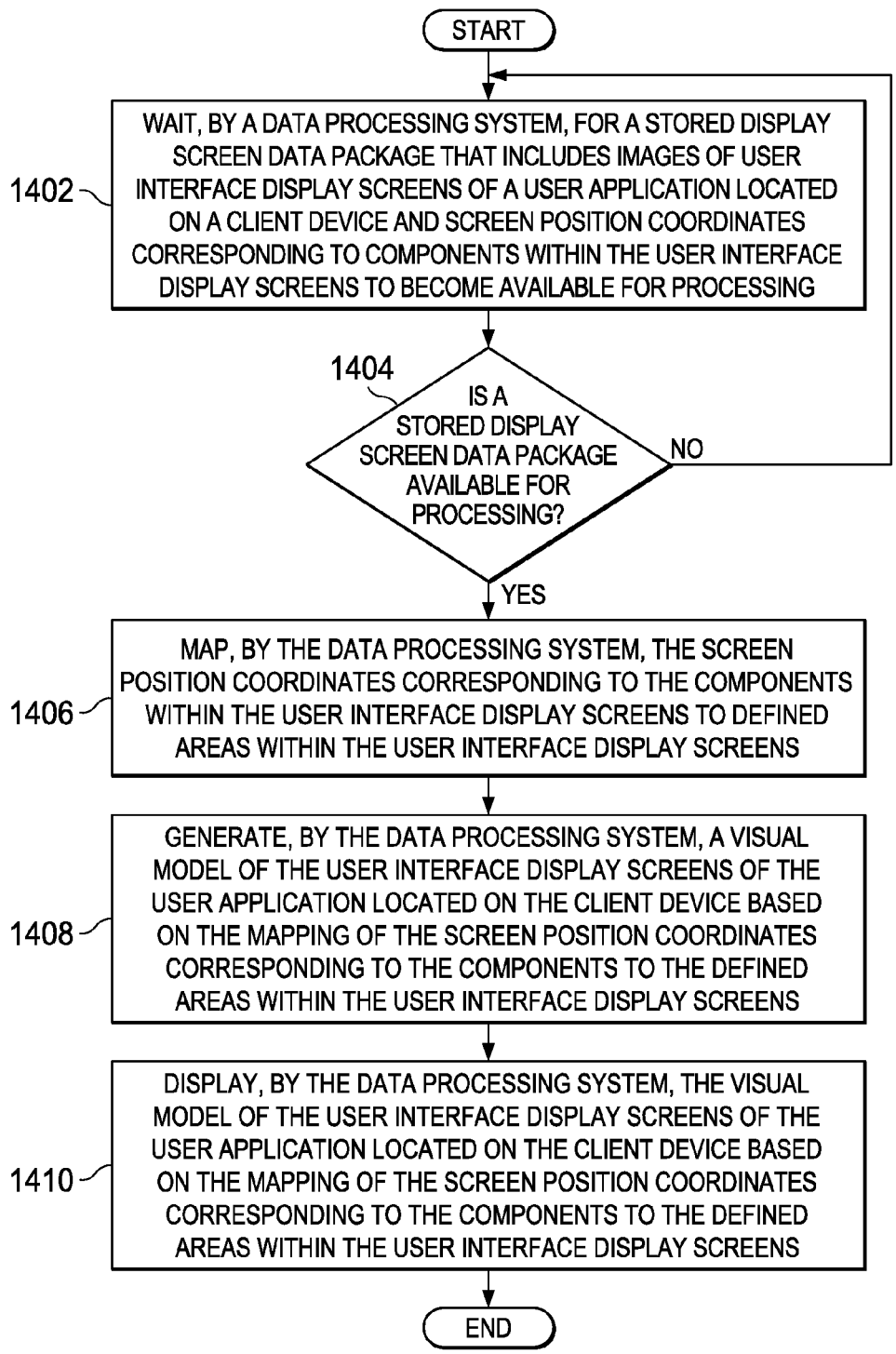
FIG. 14 is a flowchart illustrating a process for generating a visual model of a user interface display screen in accordance with an illustrative embodiment.

With reference now to FIG. 14, a flowchart illustrating a process for generating a visual model of a user interface display screen is shown in accordance with an illustrative embodiment. The process shown in FIG. 14 may be implemented in a server device, such as, for example, server 104 in FIG. 1 or application manager server device 304 in FIG. 3.

The process begins when the data processing system waits a stored display screen data package that includes images of user interface display screens of a user application located on a client device and screen position coordinates corresponding to components within the user interface display screens to become available for processing (step 1402). The data processing system makes a determination as to whether a stored display screen data package is available for processing (step 1404). If the data processing system determines that a stored display screen data package is not available for processing, no output of step 1404, then the process returns to step 1402. If the data processing system determines that a stored display screen data package is available for processing, yes output of step 1404, then the data processing system maps the screen position coordinates corresponding to the components within the user interface display screens to defined areas within the user interface display screens (step 1406).

Then, the data processing system generates a visual model of the user interface display screens of the user application located on the client device based on the mapping of the screen position coordinates corresponding to the components to the defined areas within the user interface display screens (step 1408). Afterward, the data processing system displays the visual model of the user interface display screens of the user application located on the client device based on the mapping of the screen position coordinates corresponding to the components to the defined areas within the user interface display screens (step 1410). The process terminates thereafter.

Figure 15:
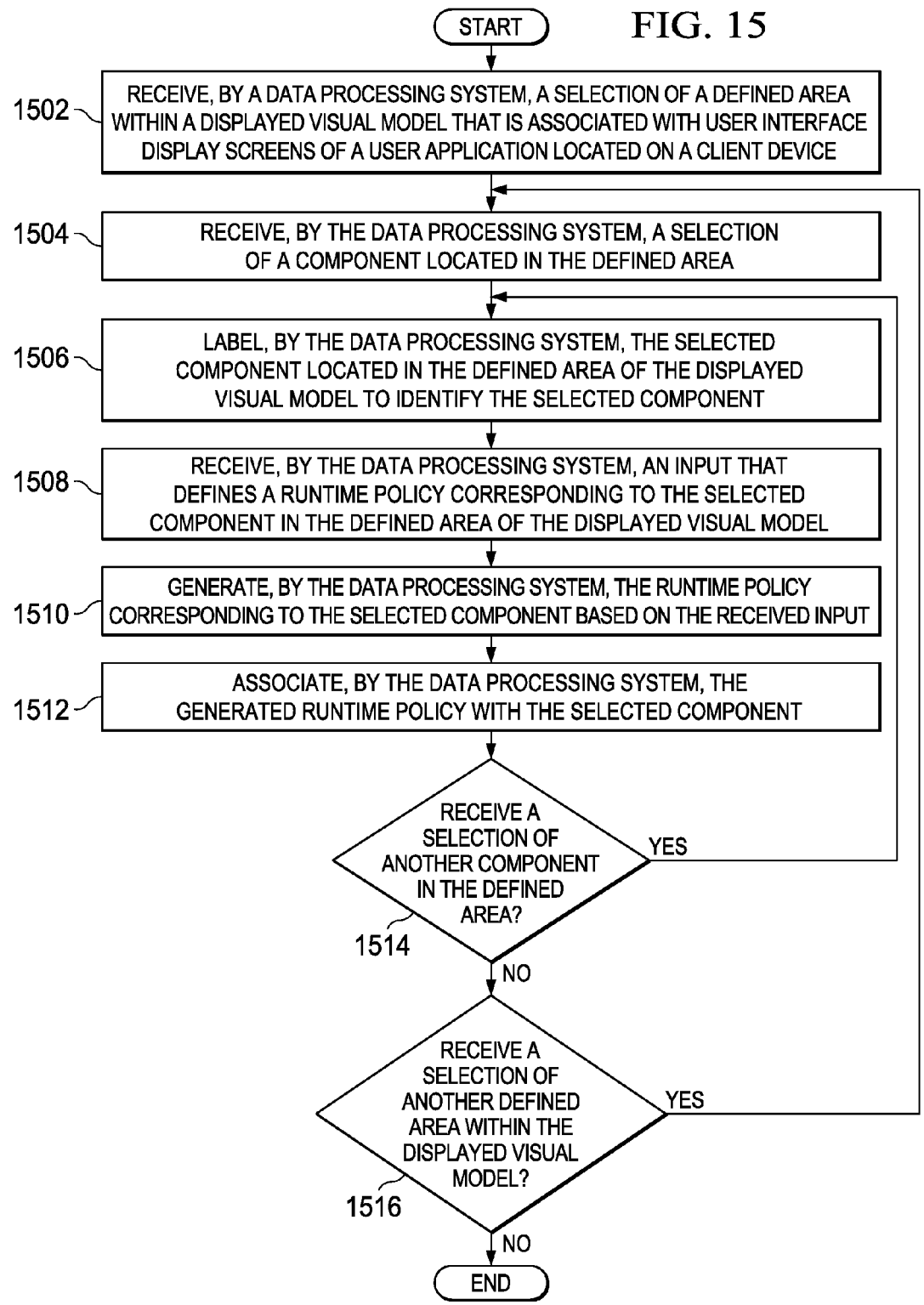
FIG. 15 is a flowchart illustrating a process for generating a runtime policy in accordance with an illustrative embodiment.

With reference now to FIG. 15, a flowchart illustrating a process for generating a runtime policy is shown in accordance with an illustrative embodiment. The process shown in FIG. 15 may be implemented in a server device, such as, for example, server 104 in FIG. 1 or application manager server device 304 in FIG. 3.

The process begins when the data processing system receives a selection of a defined area within a displayed visual model that is associated with user interface display screens of a user application located on a client device (step 1502). In addition, the data processing system receives a selection of a component located in the defined area (step 1504). Further, the data processing system labels the selected component located in the defined area of the displayed visual model to identify the selected component (step 1506).

Furthermore, the data processing system receives an input that defines a runtime policy corresponding to the selected component in the defined area of the displayed visual model (step 1508). Then, the data processing system generates the runtime policy corresponding to the selected component based on the received input (step 1510). Moreover, the data processing system associates the generated runtime policy with the selected component (step 1512).

Afterward, the data processing system makes a determination as to whether the data processing system received a selection of another component in the defined area (step 1514). If the data processing system determines that the data processing system did receive a selection of another component in the defined area, yes output of step 1514, then the process returns to step 1506 where the data processing system labels the selected component. If the data processing system determines that the data processing system did not receive a selection of another component in the defined area, no output of step 1514, then the data processing system makes a determination as to whether the data processing system received a selection of another defined area within the displayed visual model (step 1516). If the data processing system determines that the data processing system did receive a selection of another defined area within the displayed visual model, yes output of step 1516, then the process returns to step 1504 where the data processing system waits to receive a selection of a component within the selected area. If the data processing system determines that the data processing system did not receive a selection of another defined area within the displayed visual model, no output of step 1516, then the process terminates thereafter.

Figure 16:
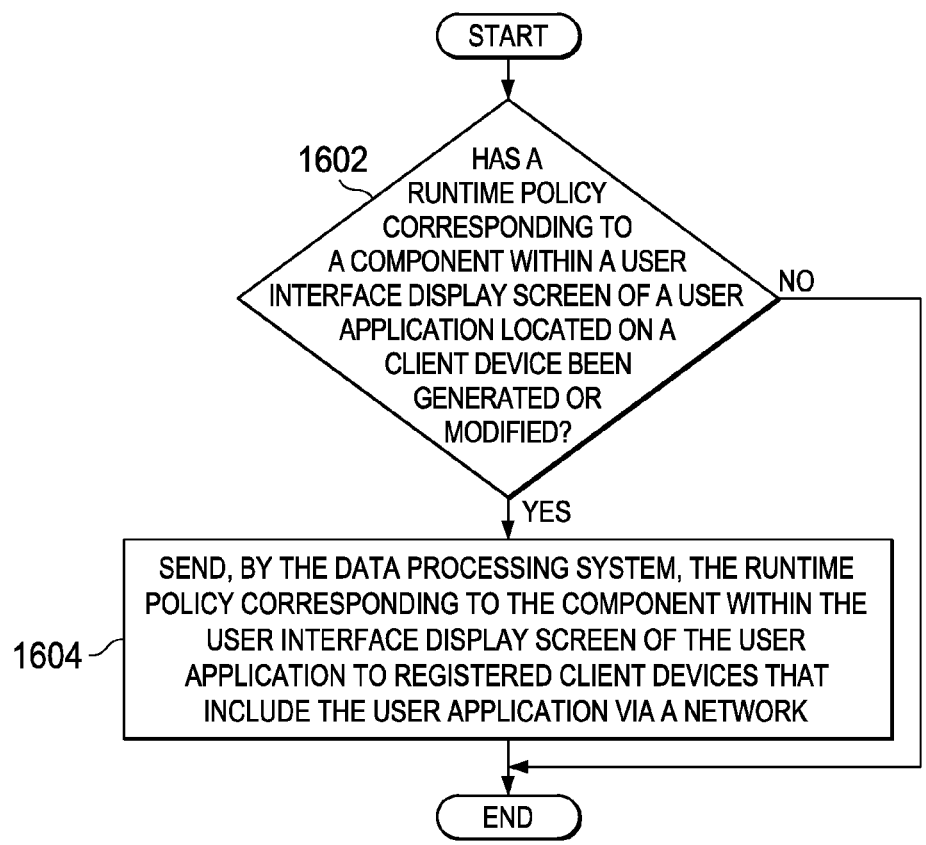
FIG. 16 is a flowchart illustrating a process for sending a runtime policy to registered client devices in accordance with an illustrative embodiment.

With reference now to FIG. 16, a flowchart illustrating a process for sending a runtime policy to registered client devices is shown in accordance with an illustrative embodiment. The process shown in FIG. 16 may be implemented in a server device, such as, for example, server 104 in FIG. 1 or application manager server device 304 in FIG. 3.

The process begins when the data processing system makes a determination as to whether a runtime policy corresponding to a component within a user interface display screen of a user application located on a client device has been generated or modified (step 1602). If the data processing system determines that a runtime policy corresponding to a component within a user interface display screen of a user application located on a client device has not been generated or modified, no output of step 1602, then the process returns to step 1602 where the data processing system waits for a runtime policy to be generated or modified. If the data processing system determines that a runtime policy corresponding to a component within a user interface display screen of a user application located on a client device has been generated or modified, yes output of step 1602, then the data processing system sends the runtime policy corresponding to the component within the user interface display screen of the user application to registered client devices that include the user application, such as registered client devices 304 and 306 that include user application 308 in FIG. 3, via a network, such as network 102 in FIG. 1 (step 1604).

Figure 17:
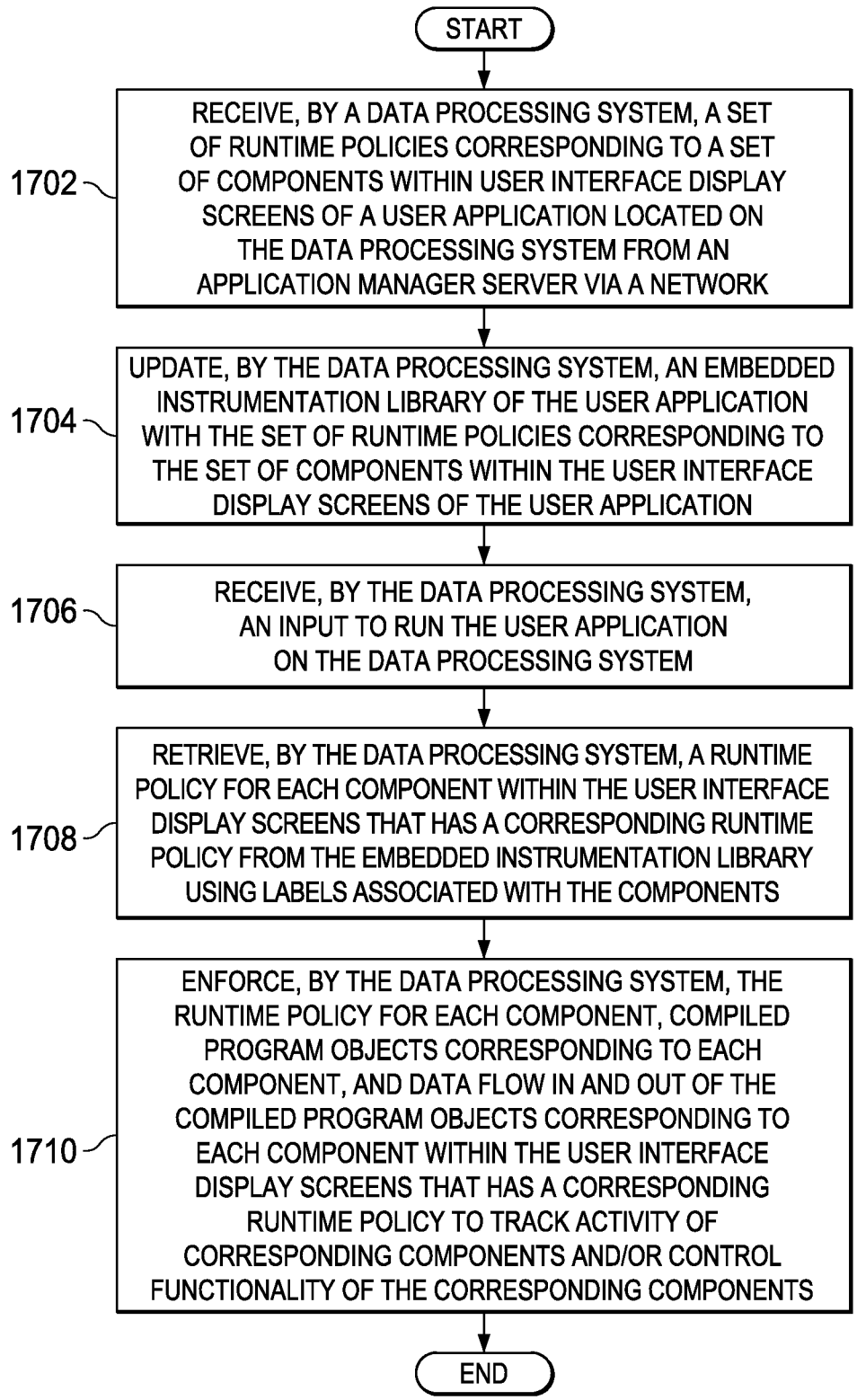
FIG. 17 is a flowchart illustrating a process for enforcing runtime policies in accordance with an illustrative embodiment.

With reference now to FIG. 17, a flowchart illustrating a process for enforcing runtime policies is shown in accordance with an illustrative embodiment. The process shown in FIG. 17 may be implemented in a client device, such as, for example, client 110 in FIG. 1 or registered client device 304 in FIG. 3.

The process begins when the data processing system receives a set of runtime policies corresponding to a set of components within user interface display screens of a user application located on the data processing system from an application manager server, such as application manager server 302 in FIG. 3, via a network, such as network 102 in FIG. 1 (step 1702). Afterward, the data processing system updates an embedded instrumentation library of the user application, such as instrumentation library 310 of user application 308 in FIG. 3, with the set of runtime policies corresponding to the set of components within the user interface display screens of the user application (step 1704). Subsequently, the data processing system receives an input to run the user application on the data processing system (step 1706).

Then, the data processing system retrieves a runtime policy for each component within the user interface display screens that has a corresponding runtime policy from the embedded instrumentation library using labels associated with the components (step 1708). Further, the data processing system enforces the runtime policy for each component, compiled program objects corresponding to each component, and data flow in and out of the compiled program objects corresponding to each component within the user interface display screens that has a corresponding runtime policy to track activity of corresponding components and/or control functionality of the corresponding components (step 1710). The process terminates thereafter.

Thus, illustrative embodiments provide a computer system and a computer program product for managing user applications. The descriptions of the various illustrative embodiments have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems, methods, and computer program products according to various illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for managing user applications, the computer system comprising:
   a bus system;
   a storage device connected to the bus system, wherein the storage device stores computer readable program code; and
   a processor unit connected to the bus system, wherein the processor unit executes the computer readable program code to:
   generate a visual model of user interface display screens of a user application by mapping components displayed within the user interface display screens to screen position coordinates and by mapping the screen position coordinates corresponding to the components to original source code of the user application;

associate labels with the components displayed within the user interface display screens of the user application in the generated visual model;

generate a runtime policy for each component in a selected set of components within the user interface display screens of the user application based on user interaction with the generated visual model of the user interface display screens;

send the generated runtime policy for each component in the selected set of components within the user interface display screens of the user application to a client device via a network; and track activity of each component in the selected set of components within the user interface display screens of the user application running on the client device using data that is tracked and logged on the client device based on the generated runtime policy for each component in the selected set of components.

2. The computer system of claim 1, wherein the processor unit further executes the computer readable program code to:

receive a display screen data package that includes images of the user interface display screens of the user application located on the client device and screen position coordinates corresponding to the components displayed within the user interface display screens from the client device via the network; and parse the display screen data package that includes the images of the user interface display screens of the user application on the client device and the screen position coordinates corresponding to the components within the user interface display screens, wherein the computer parses the display screen data package to identify each component within each of the user interface display screens.

3. The computer system of claim 1, wherein the processor unit further executes the computer readable program code to display a rendering of a user interface display screen that is currently being displayed on the client device on a display device coupled to the computer system.

4. The computer system of claim 1, wherein the processor unit further executes the computer readable program code to map the screen position coordinates corresponding to the components displayed within the user interface display screens to defined areas within the user interface display screens.

5. The computer system of claim 1, wherein the processor unit further executes the computer readable program code to:

determine whether a runtime policy corresponding to a particular component within a user interface display screen of the user application located on the client device has been modified; and send the modified runtime policy corresponding to the particular component within the user interface display screen of the user application to registered client devices that include the user application via the network in response to determining that the runtime policy corresponding to the particular component within the user interface display screen of the user application located on the client device has been modified.

6. A computer program product stored on a computer readable storage device having computer readable program code encoded thereon that is executable by a computer for managing user applications, the computer program product comprising:

computer readable program code for generating a visual model of user interface display screens of a user application by mapping components displayed within the user interface display screens to screen position coordinates and by mapping the screen position coordinates corresponding to the components to original source code of the user application;

computer readable program code for associating labels with the components displayed within the user interface display screens of the user application in the generated visual model;

computer readable program code for generating a runtime policy for each component in a selected set of components within the user interface display screens of the user application based on user interaction with the generated visual model of the user interface display screens;

computer readable program code for sending the generated runtime policy for each component in the selected set of components within the user interface display screens of the user application to a client device via a network; and computer readable program code for tracking activity of each component in the selected set of components within the user interface display screens of the user application running on the client device using data that is tracked and logged on the client device based on the generated runtime policy for each component in the selected set of components.

7. The computer program product of claim 6 further comprising:

computer readable program code for receiving a display screen data package that includes images of the user interface display screens of the user application located on the client device and screen position coordinates corresponding to the components displayed within the user interface display screens from the client device via the network; and computer readable program code for parsing the display screen data package that includes the images of the user interface display screens of the user application on the client device and the screen position coordinates corresponding to the components within the user interface display screens, wherein the computer parses the display screen data package to identify each component within each of the user interface display screens.

8. The computer program product of claim 6 further comprising:

computer readable program code for displaying a rendering of a user interface display screen that is currently being displayed on the client device on a display device coupled to the computer.

9. The computer program product of claim 6 further comprising:

computer readable program code for mapping the screen position coordinates corresponding to the components displayed within the user interface display screens to defined areas within the user interface display screens.

10. The computer program product of claim 6 further comprising:

computer readable program code for determining whether a runtime policy corresponding to a particular component within a user interface display screen of the user application located on the client device has been modified; and computer readable program code for sending the modified runtime policy corresponding to the particular component within the user interface display screen of the user application to registered client devices that include the user application via the network in response to determining that the runtime policy corresponding to the particular component within the user interface display screen of the user application located on the client device has been modified.

* * * * *